(12) United States Patent
Wright et al.

(10) Patent No.: US 6,721,802 B1
(45) Date of Patent: Apr. 13, 2004

(54) METHOD, APPARATUS AND PROGRAM FOR THE CENTRAL STORAGE OF STANDARDIZED IMAGE DATA

(75) Inventors: Eron Wright, Saskatoon (CA); Barry Willick, Saskatoon (CA); Wendell Willick, Saskatoon (CA)

(73) Assignee: Point2 Technologies Inc., Saskatoon (CA)

( * ) Notice: Subject to any disclaimer, the term of this patent is extended or adjusted under 35 U.S.C. 154(b) by 0 days.

(21) Appl. No.: 09/374,701

(22) Filed: Aug. 12, 1999

(51) Int. Cl.[7] .......................... G06F 15/16; G06K 15/00; H04N 1/40; H04N 7/173; H04N 7/20

(52) U.S. Cl. .................. 709/246; 709/246; 709/217; 709/218; 358/2.99; 358/3.01; 358/3.21; 358/401; 725/115; 725/67

(58) Field of Search ................................. 709/246, 217; 358/407; 725/115

(56) References Cited

U.S. PATENT DOCUMENTS

| | | | | |
|---|---|---|---|---|
| 4,802,008 A | * | 1/1989 | Walling | 358/141 |
| 5,778,198 A | * | 7/1998 | Kadota | 395/286 |
| 5,859,956 A | * | 1/1999 | Sugiyama | 395/112 |
| 6,281,874 B1 | * | 8/2001 | Sivan et al. | 345/127 |

* cited by examiner

Primary Examiner—Rupal Dharia
Assistant Examiner—Adnan Mirza
(74) Attorney, Agent, or Firm—Sturm & Fix LLP

(57) ABSTRACT

A system is disclosed whereby a user can upload image data into a central image database on a central server, using the processing power of a remote terminal computer to re-sample and resize each image according to a set of predetermined image parameters for storage in the central database. More than one sized or sampled copy of each discrete image could be uploaded to said centralized image database, for use in various ways. The distribution of image standardization processing to the terminal CPUs lessens the processor load of the central server, as well as minimizing the upload bandwidth required between the terminal and the central server.

66 Claims, 9 Drawing Sheets

RAW

STANDARDIZED
FOR STORAGE IN SERVER

SIZE 1x1
RESOLUTION ORIGINAL

SIZE 1x1
RESOLUTION ENHANCED

RAW    STANDARDIZED FOR
       STORAGE IN SERVER

.GIF       JPEG       I.D. #7-2      I.D. #7-3
I.D. #7     I.D. #7-1

JFIF      TIFF      I.D. #23      I.D. #23
I.D. #23    I.D. #23

METHOD, APPARATUS AND PROGRAM FOR THE CENTRAL STORAGE OF STANDARDIZED IMAGE DATA

The present invention relates to information storage and retrieval systems and, more particularly, to a system, method and program for the creation and maintenance of standardized image data in a central location from a remote client or terminal computer.

BACKGROUND OF THE INVENTION

Many database applications require the storage of photographs or other digital images in a central database, either along with, or in such a manner as to be relationally connected to other data in the central database which data can then be queried, displayed or otherwise manipulated from or by a remote client computer connected by network or otherwise.

While the most basic data entry technique comprises the entry or upload of data into the central database at the file server, the proliferation of computer networks such as virtual private networks, wide area networks and/or the internet has made it desirable to be able to upload such image data as necessary to such a central database application from a client computer remotely located on such a network.

One example of such a category of centralized database applications would be an electronic commerce system. Electronic commerce systems themselves can take many shapes. For example, one of the most basic types of electronic commerce services is the operation of a "web store", being a centralized database from which a remote user can query information about products or services and transmit purchase orders via the network to the centralized database, which database is in turn connected to the retailer's back-end software from whence orders and payments can be processed and products or services purchased can be dispatched to the buyer. This type of an electronic commerce application would typically be operated by a conventional retailer offering some of their products or services for sale via the internet, or a company established to offer products for sale via an internet site as their primary distribution point. In either such case, the product information stored in the central database would either be administered from the retailer's file server, or from one or more dedicated data entry terminals connected in close proximity, likely by a local area network, to the file server.

In commerce applications such as this, as internet users' comfort level and knowledge of the sophistication of the internet increases, the provision of photographs or graphic material related to various database records provides a more complete shopping or selling experience and may increase the selling power of the database.

The equipment overhead and technical support necessary to operate the computer systems that host these various "netcentric" applications is high. The outsourcing of many of these functions to dedicated internet service companies, rather than performing the services in-house on one's own computer equipment, has grown in popularity.

In addition to the outsourcing of network systems, there has also been the development of a sector in the internet economy which deals with the provision of centralized brokerage or operation of an internet database application, which individual users can manipulate and administer from their own client computers on the internet, generally speaking by simply operating their internet browser software.

Basic examples of such a user-administered, centralized database application are on-line auction sites or the like, such as eBay™. A user offering an item for sale via such a site can set up a sale record in the central database and can optionally be given the opportunity to upload an image or photograph of their item to the centralized database for storage with the remainder of the sale record associated with that item, for eventual display upon receiving a user query for information associated with that item.

Where centralized data entry is not used, centralized image processing is not feasible either. For example, in the case of a consumer setting up an auction for some particular item on one of many auction sites available on the internet, the consumer enters the various product information in a form for submission to the central database, where it is validated and posted and made available to other members of the public or other subscribing members of that database. Any image or images to be submitted along with the remainder of the data need to be attached to the form in some way or alternatively transmitted with some type of a correlating identifier. In such a database application there could be many millions of records and the operator of the database likely does not wish to be responsible for the manual entry or even partial manual processing of various image files into their database. Again, this stresses the importance of an automated method of posting image data to a central location.

Where the product sales data stored in the centralized database included pictures or other images, it would obviously be desirable to provide standardized image output from the database on processing of a consumer query. This would allow for the standardization of the reporting tools used to report such queries as well as smoothing out the application interface. In such a centrally controlled application, the image data stored in the database might be created with the standard formatting attributes desired, or might alternatively be reformatted in advance of loading into the central database. A process for the automated resizing, re-sampling or application of other formatting attributes to various image files for loading into such a central database would improve the efficiency of creating or maintaining image data stored in such a centralized database application as well as the quality of the data stored.

One of the problems which arises with any application gathering photo or image data from numerous users is the difference in image file types, resolutions or sizes, or other attributes associated with each image file. For example, one user may supply their image files in JPEG format, having exported them from a professional imaging software, while another user might have various images stored in his computer in, for example, a GIF format from a digital camera or the like. The resolution of one image may be near photo quality, while the resolution of another image may be grainy at best.

Obviously another major image attribute, in addition to file format and resolution, where standardized query results are wished to be reported, is that of image size. Where images of widely varying sizes are uploaded into the central database it is difficult, if not impossible, to program a smooth query reporting interface. If it were possible to provide an image uploading facility which would upload only images of the desired size, resolution or other qualities, the programming and interfaces of these centralized database applications could be improved.

Having identified the utility of a system and method which would allow for the storage of image data in a standardized format in a centralized database for access by clients from remote locations on a network connected to said centralized database, there are other factors which, to some extent, dictate the optimal solution to the problem. For example, while the reformatting of the image files submitted by a network user could be done by the file server or by another server operated by the server of the database, the processing power required to handle such repeated image processing tasks would be substantial and would require the augmentation of the central database server hardware, likely at considerable additional cost to the database operator. In addition, the concurrent receipt of numerous image files being transmitted to the centralized database, even if properly identified, would likely necessitate the queuing of such image files for processing into their standardized formats for posting to the database itself, resulting in less than simultaneous posting of information.

In addition, where files were to be reformatted into a compact and clear image format for viewing upon location in a user query of the central database over, for example, a slower network connection such as a modem connection to the internet, it would be desirable to minimize the bandwidth requirements of the application both in terms of posting an upload of image data to the centralized database as well as in terms of downloading of query results. For that reason, it would be desirable to process the image into the most compact format possible or desirable at the remote user's network client computer, rather than transmitting what, in some cases, may be very large image files in non-compact file formats to the centralized database for processing and posting to the central database.

SUMMARY OF THE INVENTION

It is the object of the present invention to provide an apparatus, method and program for the central storage of standardized image data in a network database application. Specifically, it is the object of the present invention to provide an apparatus, method and program whereby photographs or other digital images stored on a terminal computer, operatively connected to a central server, can be manipulated automatically at the terminal computer to meet a set of predetermined image standardization criteria before uploading into a central database stored in the memory of the central server.

The apparatus of the present invention, being an apparatus for the storage of standardized image data, comprises a central server computer in which standardized image data is stored; at least one terminal computer, said terminal computer being adapted for communicating with said central server; said terminal computer containing a terminal program adapted to be executed by said terminal computer, for re-formatting specified raw image data stored in the terminal computer to meet a predetermined set of image standardization criteria, said reformatted specified raw image data being standardized image data, said standardized image data then being transmitted to the central server computer for storage.

Various image standardization criteria might be included in the predetermined set of image standardization criteria exercised on the specified raw images. For example, the image standardization criteria might include standard file formats, standard image sizes or dimensions and/or standard image resolutions.

In the case of a standard image size, the specified raw image could be standardized by scaling the specified image to the standard size required. With respect to image resolution, image resolution could be standardized by re-sampling of the raw image in question.

Where a standard file format was used, the specified raw image could be standardized by reformatting the raw image into the standard file format.

The terminal program could be adapted to authenticate the user of the terminal computer against user profiles stored in the central server computer in advance of the re-formatting of the specified image data. In addition to adding a security feature, the authentication of the user would also allow for the downloading of a user-specific set of image standardization criteria to the terminal computer from the central server computer upon authentication, which would allow for the adjustment of the operations of the terminal computer depending on the user according to preset system parameters.

The central server computer and the terminal computer could be connected by a network, and it is particularly contemplated that such a network might be the internet. The terminal program might be a stand-alone software or alternatively might be an add-in to an existing piece of software already resident in the terminal computer. As an add-in, the terminal program might be a browser plug-in or a JAVA™ applet.

The terminal program could also be adapted to verify that the transmission of the standardized image data to the central server computer has taken place without errors. This might be done by having the central server computer send an error-free message to the terminal computer. Optionally, if the transmission took place with an error, terminal program could be configured such that it would resend the corrupted data.

In certain situations, it might be desirable to generate more than one standardized image from each specified raw image. For example, in a situation where it was desired to upload an image at a particular size and resolution to the central server computer, and also to upload a thumbnail of that image at perhaps a different size and/or resolution and/or file format. In such a case, the set of image standardization criteria might include criteria for the generation of this more than one standardized image from the specified raw image data and the terminal program would then yield this multiple number of standardized images from each raw source image.

The terminal program might be resident in the terminal computer, by being stored on a disc or otherwise in the memory of the terminal computer. Alternatively, the terminal program could also be called from or loaded from the central server computer into the terminal computer upon demand, such as in the case of a JAVA™ applet. Similarly, the predetermined set of image standardization criteria could also be fixed within the memory of the terminal computer, or alternatively could be loaded from the central server computer on demand.

This apparatus might be further improved or modified by having the terminal program assigns identifying matter to the standardized image data generated, whereby the identifying matter, such as a key number or other type of code, could be transmitted to the central server computer along with the associated standardized image data. To take this aspect of the invention one step further, the central server computer might also contain a program adapted to be executed by the central server computer for filing the standardized image data when received from the terminal computer in storage in the central server computer in accordance with the identifying matter, that is to say using the identifying matter as a key to properly file the received standardized images.

Where such identifying matter was assigned by the terminal program, the identifying matter could be obtained by input from the user of the terminal computer, or alternatively the terminal program could generate the identifying matter on some other criteria or basis. The terminal program might use parameters or information downloaded from the central server computer in the generation of identifying matter.

A preview function could also be added to the terminal program where the terminal computer also had a display unit. The terminal program could be adapted such that the terminal computer would display the standardized image data on its display unit for approval by the user of the terminal computer before transmission thereof to the central server computer for storage.

Any number of terminal computers could be used in conjunction with the central server computer.

The present invention also encompasses a method of standardizing image data for storage in a central location, using a central server computer in which standardized data is to be stored and at least one terminal computer in which raw image data is stored, said terminal computer being adapted for communication with said central server computer, said terminal compute containing a terminal program adapted to be executed by said terminal computer, said method comprising the steps of specifying the raw image data within the terminal computer to be standardized; reformatting said specified raw image data to meet a predetermined set of image standardization criteria, the resulting reformatted specified raw image data being standardized image data; and transmitting said standardized image data to the central server computer for storage therein.

The method might be improved by adding a step of authenticating the user of the terminal computer against user profiles stored in the central server computer in advance of the selection of the raw image data to be reformatted. This would allow for the addition of some security to the application, as well as the fact that upon user authentication a further step could be added whereby a user-specific predetermined set of image standardization criteria could be loaded from the central server computer into the terminal computer and the user-specific criteria could be used.

The specified raw image data could be selected by user input at the terminal, or could alternatively be selected in some automatic manner by the terminal program.

In the method of the present invention, the predetermined set of standardization criteria might include any number of image formatting attributes, including a standard file format, standard image dimensions and/or standard image resolution for the standardized image data generated by the method of the present invention.

Where the predetermined set of standardization criteria includes a standard file format, the method of re-formatting said specified image data to meet the predetermined set of standardization criteria might comprise converting the specified image data to the standard file format. Where the predetermined set of standardization criteria includes standard image dimensions, the method of re-formatting the specified image data to meet these criteria might comprise the scaling of the specified image data to the standard image dimensions desired. Where a standard image resolution was desired, specified image data could be re-sampled to increase or decrease the resolution of the image.

In the method of the present invention it might be possible to also generate more than one standardized image result from each piece of specified raw image data selected. That is to say that numerous standardized images, each of which would match a certain set of standardization criteria, could be generated from a raw image and this series of standardized images uploaded to the central server computer as standardized image data.

The method of the present invention might also comprise the assignment of identifying matter to the standardized image data associated for transmission to the central server along with the standardized image data. This identifying matter could be used to categorize or properly file the standardized image data in the central server computer.

Where identifying matter was used, these could be assigned by user input at the terminal level, or could alternatively be generated by the terminal program. Where the terminal program was generating the identifying matter, the method might also further comprise the loading of certain parameters from the central server computer for use in the generation of the identifying matter. An example of this would be the loading of identifying key information from the central server computer for use with newly generated standardized image data which is to be uploaded for use with a pre-existing data record in the image database on the central server computer.

The terminal program might be resident in the terminal computer or alternatively might be loaded into the terminal computer from the central server computer on demand, such as in the case of a JAVA™ applet. In the method of the present invention, the central server computer and the terminal computer(s) might be connected by a network such as the internet, or might alternatively communicate in a different manner such as radio or the like.

Also disclosed is a computer program operative to control a terminal computer, said program being stored on a computer readable medium, for the standardization of specified raw image data residing in said terminal computer for transmission to a central server computer, with which said terminal computer is adapted to communicate, which computer program, when executed by the terminal computer, will perform the steps of selecting the raw image data to be standardized from storage in the terminal computer; reformatting the selected raw image data to meet a predetermined set of image standardization criteria, said reformatted raw image data being standardized image data; and transmitting said standardized image data to the central server computer for storage therein.

This computer program might apply any number of different formatting attributes to raw image data, as image standardization criteria. For example, the image standardization criteria might include one or more of the following: a standard file format; standard image dimensions; or standard image resolution.

This computer program might be used where one or more raw images are desired to be standardized. One or more standardized images might be generated from each raw image.

Where the predetermined set of image standardization criteria includes a standard file format, the reformatting step of the computer program would comprise converting the selected raw image data to the new standard file format. Similarly, where the predetermined set of image standardization criteria included standard image dimensions, the reformatting step of the computer program might comprise scaling the selected raw image data to said standard image dimensions. As well, where the predetermined set of image standardization criteria includes a standard image resolution, the reformatting step of the computer program of the present invention might comprise to re-sampling the selected raw image data to a new standard image resolution.

The computer program of the present invention might be further altered by adding a step of assigning identifying matter to the standardized image data upon generation thereof for transmission to the central server computer along with the standardized image data. The identifying matter might be used to properly file the standardized image data in the central server computer.

Where identifying matter was used, it could be assigned by user input at the terminal computer, or alternatively could be generated by the computer program of the present invention.

Where the computer program of the present invention was generating the identifying matter, parameters received from the central server computer could be used in the generation of such identifying matter.

Upon the communication of standardized image data containing identifying matter to the central server computer, the identifying matter could be used to properly file the standardized image data in the central server computer.

The computer program of this invention might also comprise a step to error check the receipt of the transmitted standardized image data by the central server computer after transmission thereof, and to resend the standardized image data if the central server computer did not receive the standardized image data without errors.

The apparatus, method or program of the present invention could be used to create one or more standardized images from a source image stored in the terminal computer, each standardized image meeting one set of image standardization criteria. Alternatively, where the selected image data in the terminal computer comprises more than one image, the method, apparatus and program of the present invention could actually be used to produce sets of one or more standardized images for each source image.

The invention will allow for the uploading of images meeting standard criteria to a central database with a minimum processor load on the central server computer, since the terminal CPU is used to actually perform the standardization processes on the source image data. As well, by standardizing the image data at the terminal computer level, the upload bandwidth required between the terminal computer and the central server computer is minimized.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

The present invention is directed to a system for the re-formatting of image data stored in a local terminal computer into a standardized format, in accordance with a predetermined set of image standardization criteria, and then uploading this standardized image data yielded from the re-formatting process for storage and retrieval in a central database on a central server computer.

Figure 1:
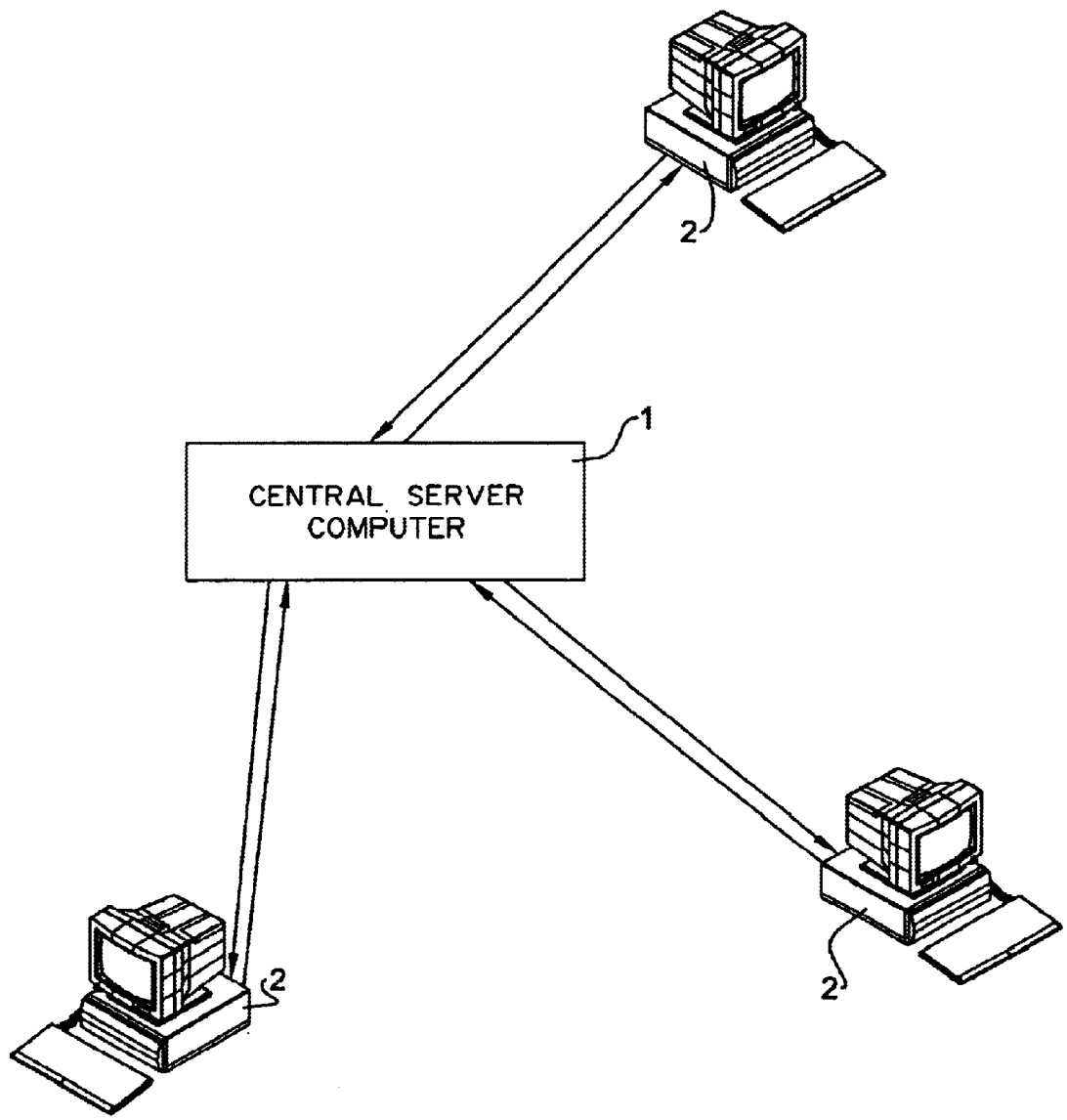
FIG. 1 is a system diagram of one embodiment of the apparatus of the present invention.

FIG. 1 is an overall system block diagram of a preferred embodiment of the present invention. In this embodiment, a central server computer (1) is linked up to at least one terminal computer (2). Three terminal computers (2) are depicted in FIG. 1, but any number of terminals (2) could be used.

The link between the terminal computer (2) and the central server computer (1) does not have to be a physical link—it can, for example, be a link via a modem, some type of a radio connection or any other link. An image standardization transaction can be initiated from any one of the terminal computers (2). The information which is required to implement the transaction is contained in both the central server computer (1) and the terminal computer (2). The terminal computer (2) prepares the necessary information before communicating the result of the image standardization transaction to the central server computer (1) for storage and retrieval in a central database on the central server computer (1).

The system depicted in FIG. 1 may be embodied in hardware specifically provided to implement the present invention. Alternatively, the system may be implemented using the infrastructure that already exists in a particular company or for a particular user. It is particularly contemplated that the central server (1) and the terminal or terminals (2) might be a server and client computers connected via the internet. The hardware and communication links of these systems may be used as an infrastructure for the practice of the present invention. Changes to the existing central server/server (1) to incorporate the subject invention may be accomplished in various ways, such as by reprogramming an existing file server or by adding an additional file server (with or without a CPU entirely dedicated to the receipt and filing of completed data from image standardization transactions of the present invention conducted on downstream terminals (2)). Alternatively, the subject invention may be implemented using existing hardware entirely, making appropriate software updates.

Figure 2:
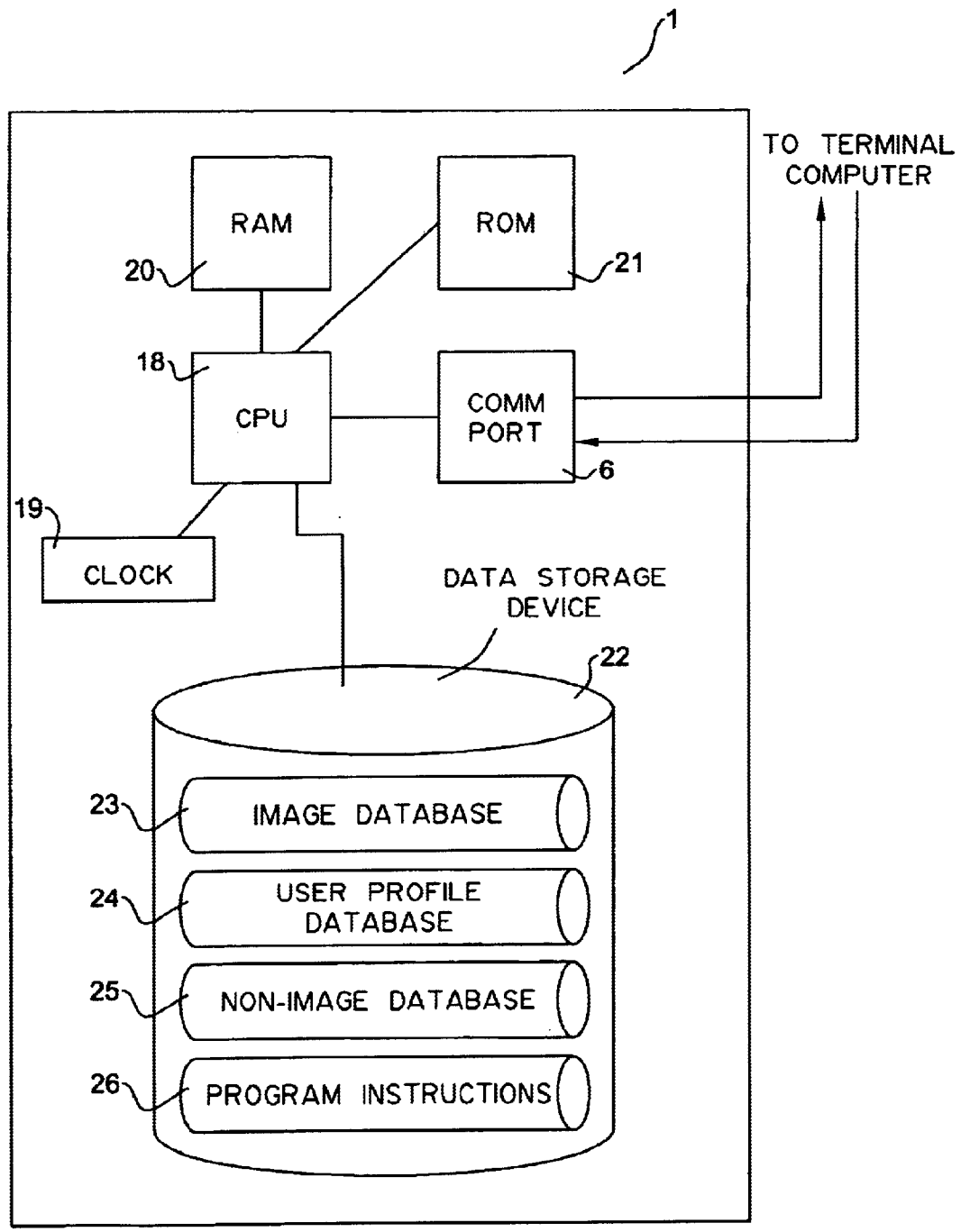
FIG. 2 is a block diagram of one embodiment of the central server of the embodiment of FIG. 1.

FIG. 2 is a block diagram of a preferred central server (1) of the present invention. The central server computer (1)

includes a CPU (18) which performs the processing functions of the server (1). It also comprises a memory system. The memory system might include read-only memory (ROM) (21), random access memory (RAM) (20) and disc or other storage space (22). The ROM (21) is used to store at least some of the program instructionS that are to be executed by the CPU (18), such as portions of the operating system (BIOS). The RAM (20) is used for temporary storage of data and a clock (19) circuit provides a clock signal required by the CPU (18). The use of a CPU (18) in conjunction with ROM, RAM, disc-based storage devices and the like, and a clock circuit is well-known to those skilled in the art of CPU-based electronic circuit design. The central server computer as referred to herein means the combination of memory and storage devices used to retain data within the server (1).

The central server (1) also includes a communications port (6) which is used to communicate with devices outside of the server (1). In particular, the port (6) facilitates communication between the server (1) and a terminal (2). The port (6) might be a modem, a network connection, or some other method or apparatus allowing for the transmission and receipt of data by the server (1) to an external device.

While the illustrated embodiment here uses a network connection as the server port (8) to communicate with devices outside of the central server (1), including the terminal or terminals (2), it should be understood that other method of communication could be used instead of a modem. These other methods include hard wire connections, radio communications, optical communications, and the like, and it will be understood that all such methods of communication between the terminal (2) and the server (1) are contemplated within the scope of the present invention.

The central server (4) includes an image database (23), and optionally a user profile database (24), which are described below. In addition, it includes transaction processor instructions (26) which can be read and executed by a CPU of the central server (3) where necessary to complete the storage of images received from the terminal (2) or to otherwise complete the execution of a data processing transaction. The program instructions (26) might also include elements of the terminal program to be used by the terminal computer (2). Also optionally other non-image databases (25) might be included on the data storage system of the central server computer (1), which may or may not be related to the information stored in the image database (23).

While this figure depicts separate image databases and user profile databases, a single database that incorporated both of these functions could also be used and it will be understood that such a modification to the contents of the central server (4) is contemplated within the scope of the present invention.

Figure 3:
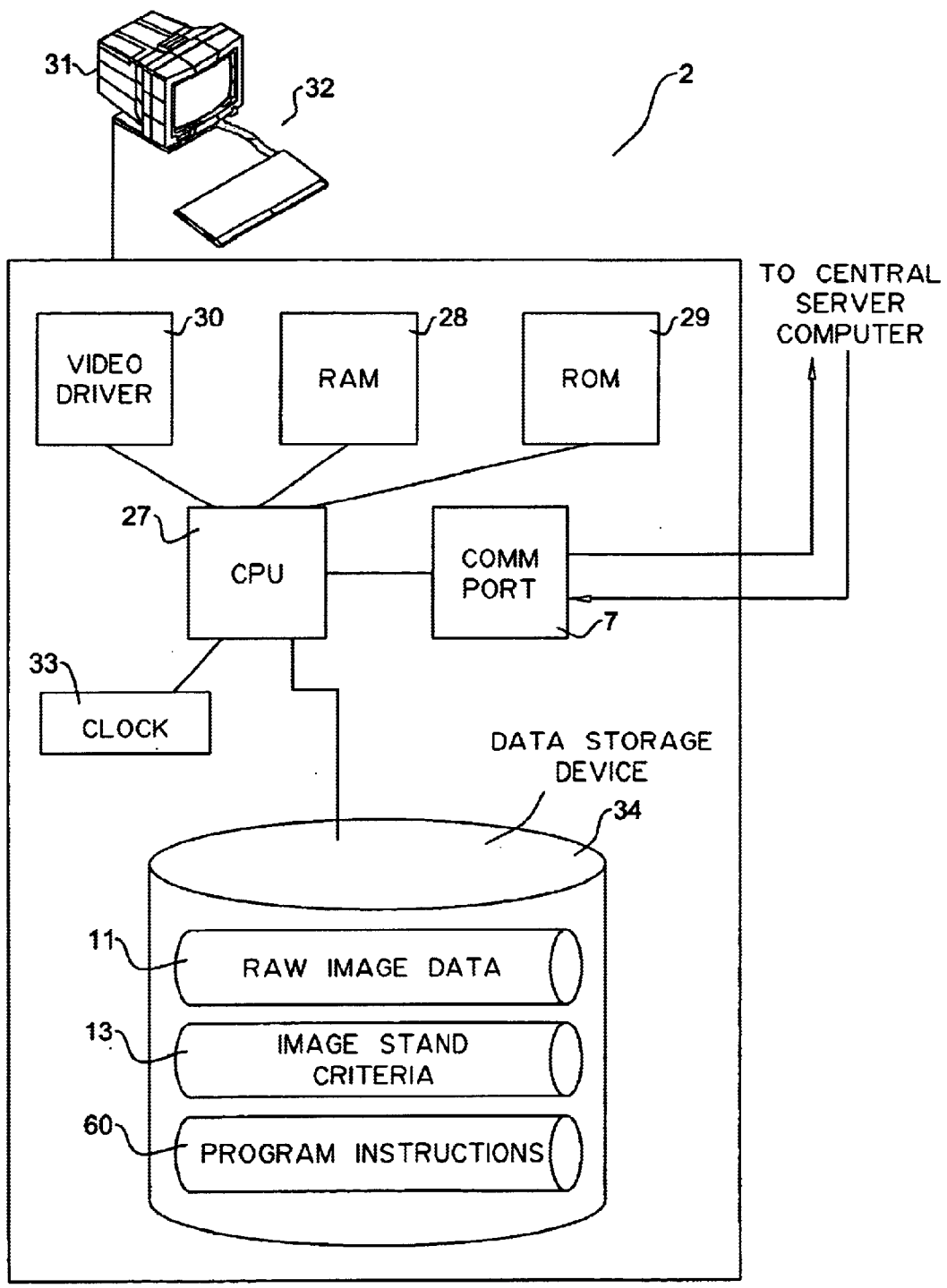
FIG. 3 is a block diagram of one embodiment of the terminal of the embodiment of FIG. 1.

FIG. 3 is a block diagram of a preferred terminal (2) of the present invention which can be located at a remote location from the central server (1). In the case of a distributed web commerce application, for example, the terminal (2) might be located at a customer's site, whereas the central server (1) would be located at the site of an internet service provider or the operator of the web commerce database application in question. As discussed above, there can be any number of terminals (2) linked up to one central server (1).

Like the central server (1) described above, the terminal (2) includes a terminal CPU (27), and terminal memory, which again would include potentially ROM (29), RAM (28), clock circuit (33), and/or storage device (34) for data.

The terminal (2) also includes a communications port (7) that facilitates communication between the terminal (2) and the central server (1). Of course, instead of the network connection depicted in the figure, other ways of communicating can be used, as described above for the central server (1).

A standard computer running appropriate communication and interface software, may be used as the terminal computer (2).

Dedicated software might be used to accomplish the objects of the present invention, or alternatively it is specifically contemplated that where the connection between the terminal (2) and the central server (1) is via the internet and the terminal (2) is equipped with an internet browser software package, the present invention might be carried out, building on the already present features of the internet browser, as a browser plug-in or applet.

The terminal (2) may also include a terminal input device (32) of some type, whether that be a mouse, keyboard or combination thereof in conjunction with a monitor (31). The input device (32) may interface directly with the CPU (27) as shown in the figure, or alternatively an appropriate interface circuit (30) may be placed between the CPU (27) and the input device (32).

Raw image data (11) is stored in the memory area of the terminal computer (2). Also stored therein might be the predetermined set of image standardization criteria (13) and the program instructions for the terminal (60).

Figure 4:
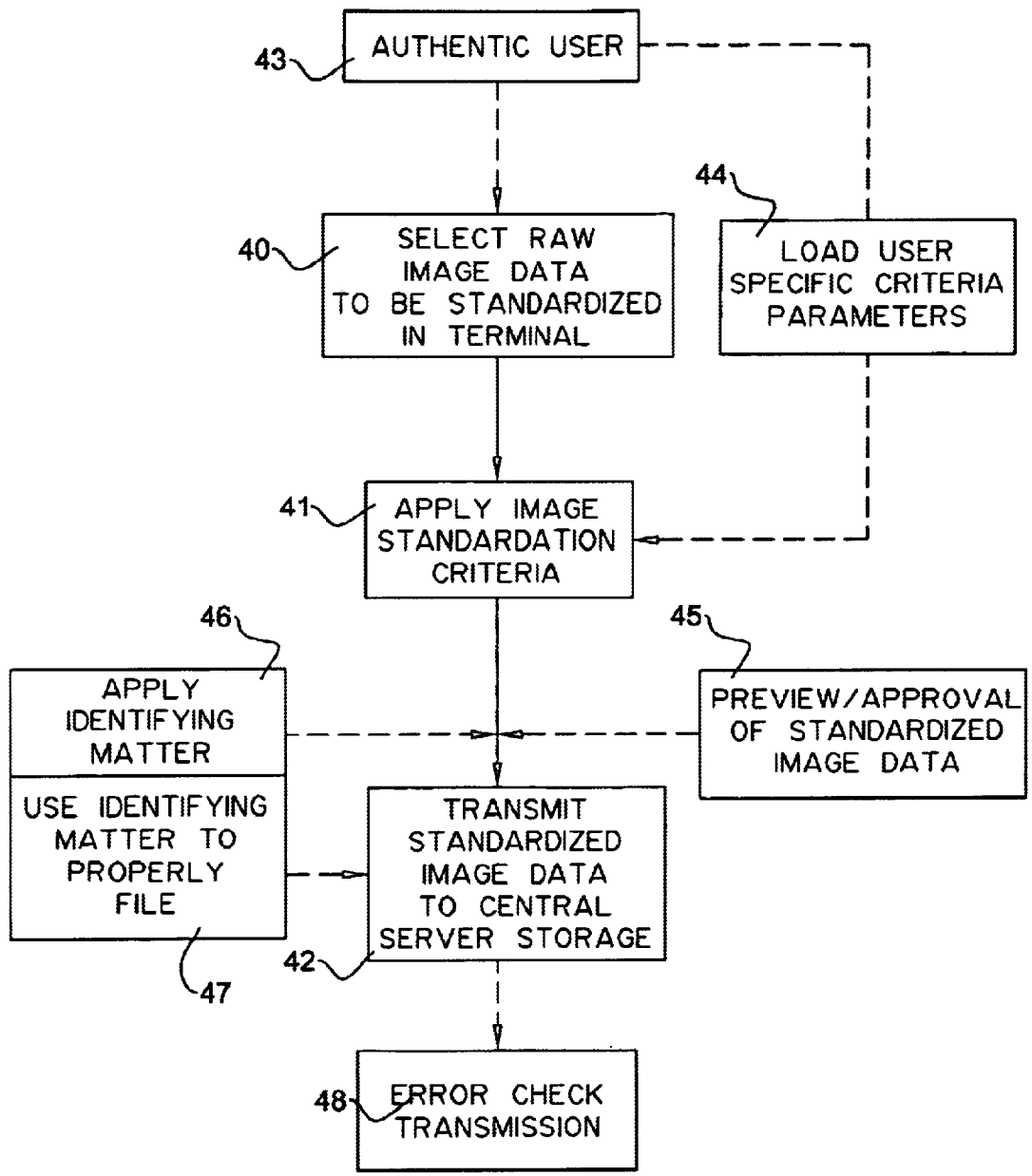
FIG. 4 is a flow chart depicting the processing of an image standardization transaction in one embodiment of the apparatus of the present invention.
Figure 5:
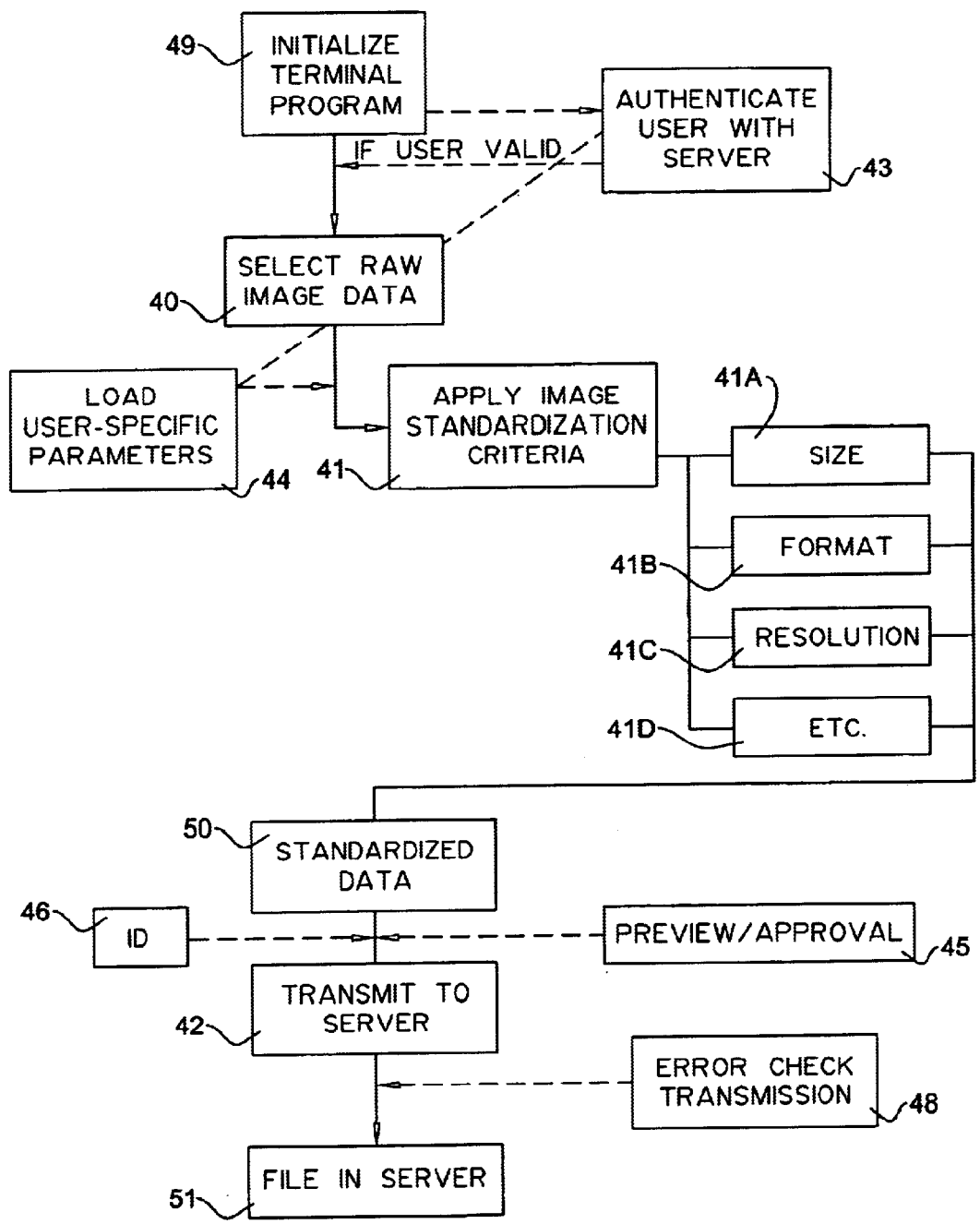
FIG. 5 shows the embodiment of FIG. 4 in more detail.

FIGS. 4 and 5 demonstrate the conduct of an image standardization transaction in the apparatus of the present invention. Raw image data is selected (40) from data contained in the terminal memory to be standardized for storage in the central server computer.

One example of image data which might need to be standardized for uploading to a central database might be digital photographs or other images stored on the terminal (2) which are desired to be uploaded to the server (1) by a customer in a customer-administered web directory, sales or auction system. The customer could upload the standardized photos to the central database for query and display by other users of the central database. Obviously, however, it will be desirable to have all of the photographs or other images uploaded by users of the system terminals (2) to be formatted the same way so that the display, interface and query reporting of the central database system can be simplified and smoothed. For example, if the internet were the network used to connect the server (1) and the terminal (2), and if the central database being used were a system by which queries could be processed and results displayed in HTML pages via the internet, it might be desirable to have all of the images loaded in, for example, a JPEG format, of similar resolution and dimensions.

Once the terminal image data to be converted was selected from data contained in the terminal computer, the terminal program would re-format the specified image data according to the predetermined set of image standardization criteria stored therein shown at (41).

In the example given above, of converting various image files into standardized JPEG images of similar resolution and dimensions, the terminal program might first identify the file format of the specified raw data and convert that to the desired standard image file format, which might for example be a JPEG file format. The application of the image standardization criteria is shown in FIG. 5 in detail at (41), (41A), (41B), (41C) and (41D). In particular, (41D) demonstrates that file formatting attributes other than size, format or resolution might be applied and are contemplated within the scope of the present invention.

Also demonstrated is the authentication of a user with the central server computer at (43). By authenticating the user of the terminal computer upon initialization of the terminal program, at (49), a degree of security can be provided in the system of the present invention, as well as allowing for optionally the loading of user-specific standardization criteria or other parameters from the central server computer to the terminal computer, shown at (44), in advance of the reformatting of any raw image data.

The next criteria which might be applied might possibly be to yield images of similar resolution. The terminal program could test the resolution of the image and re-sample the image at the specified standard resolution. Finally, if the dimensions of the image also needed to be changed, the program could convert the specified image to the standard dimensions desired by way of a scaling operation and scaling calculation.

It will be understood that other image standardization criteria might also be desired. It will be understood that the operation of the apparatus of the present invention would cover any such variations and, as such, they are all contemplated within the scope of the present invention.

Standardized image data (50) is yielded by the application of the image standardization criteria at (41). Once the specified image data has been standardized by application of the predetermined set of image standardization criteria by the terminal program, the standardized image data is transmitted to the central server where it is stored.

In certain situations, more than one standardized image might be required from each piece of specified raw image data. For example, in the example given above of uploading photos of an item for sale to a central database for broad-based query and display, a user might have a photograph in a .GIF image format, such format being given only by way of example, which he desires to upload to the central database on the server. The operators of the central database on the server may have predetermined that they would use, for example, a JPEG format for the photos stored in their database but, in addition, the database may store more than one copy of such photograph. For example, a full-scale and higher resolution image may be stored along with a smaller low-resolution thumbnail of the same image, whereby the thumbnails could be used in an overall display feature on the query and reporting end of the central database application where the full-size and full-resolution image was not required. In such a case, the predetermined set of image standardization criteria might include criteria for the generation of more than one standardized image from each specified image. The terminal could generate each of the standardized images required and then upload them all to the memory of the server for filing and use. This is considered as just another example of the versatility of the present invention insofar as various sets of criteria could be applied to each specified raw image.

Another extension of this concept of multiple images being created and standardized from one piece of specified raw data would be that the image standardization criteria might specify as a criteria a series of more than one network address representing individual servers to which the standardized images should be sent.

An optional addition to the program, process or apparatus of the invention is to assign identifying matter, such as a serial number or other key information to the standardized image data as it is generated by the terminal program. This is shown in FIGS. 4 and 5 at (46). The identifying matter might be applied either by seeking input from the user of the terminal computer (2), or alternatively the terminal program could generate the identifying matter independently, or using parameters downloaded from the central server computer, potentially altered by the authentication of the user. The identifying matter is then transmitted to the central server computer along with the standardized image data to which it refers and then the identifying matter can by used by the central server computer to file the standardized image data properly.

Image data to which the terminal computer (2) has access which is not stored directly within the memory system of the terminal computer (2) might also be included within the scope of the present invention insofar as if the terminal computer (2) has access via a network or otherwise to this other data, that data could also be specified as the raw data to be standardized and uploaded to the central server computer.

Also demonstrated in FIG. 5 is the addition of a preview function (45) to the terminal program. Once the image standardization criteria has been applied to the specified data, the standardized image data could be displayed for approval by the user of the terminal (2) before release and transmission to the server (1) for filing and storage.

Also shown in FIGS. 4 and 5 is the error-checking ability of the system of the present invention, whereby upon transmission of standardized image data to the server, the terminal (2) would wait to receive a message from the server that the standardized image data had been received without error, and if the standardized image data was not received without error, the terminal (2) could initiate a resending of that same data until the transmission was successful, or alternatively until the transmission was cancelled.

In an embodiment, where identifying matter has been appended to the standardized image data before transmission to the server (1), the server (1) might use said identifying matter to determine the proper method and location for storage of the standardized image data in the central server (4). For example, the identifying matter might be used to tag the particular image being uploaded onto a particular pre-existing record in a database.

Figure 6A:
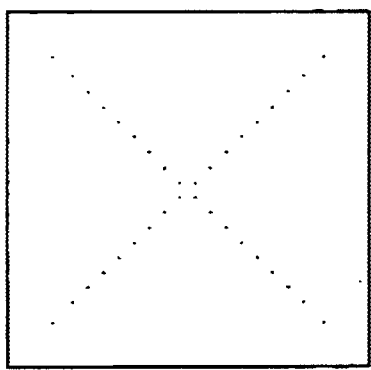
FIG. 6A is a block diagram illustrating a one-to-one conversion whereby a single piece of raw image data is converted to standardized image data, in one embodiment of the apparatus of the present invention.
Figure 6A:
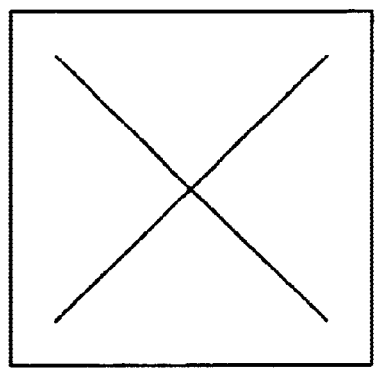

FIGS. 6A to 6D demonstrate several types of standardization transactions which can be performed by the system of the present invention on various specified image data (13). FIG. 6A shows a "one-to-one" conversion whereby a single piece of raw image data is converted to standardized image data. In the specific case demonstrated, the image is re-sampled to provide a standardized resolution.

Figure 6B:
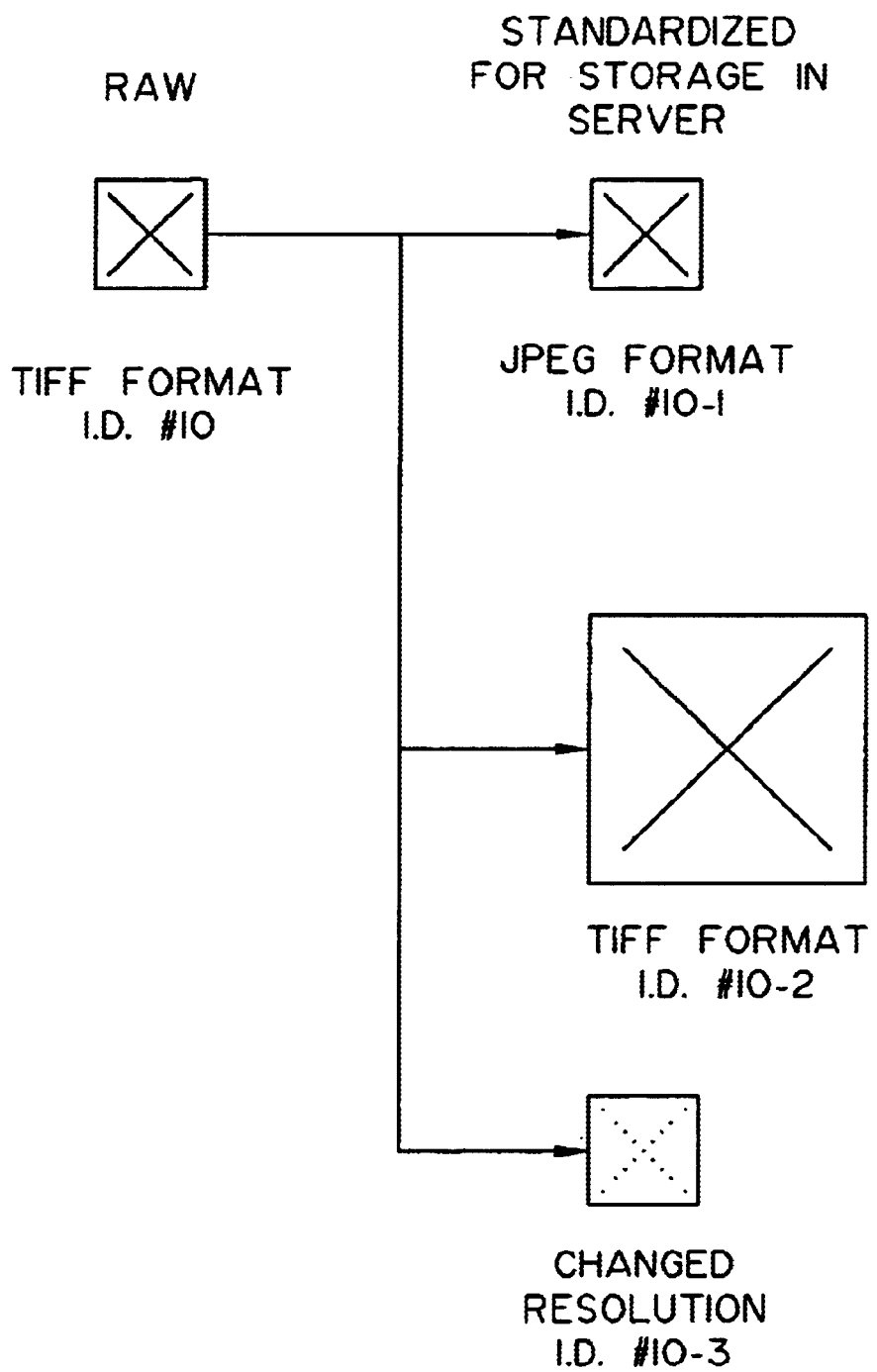
FIG. 6B is a block diagram of a one-to-many conversion whereby one piece of specified raw image data is converted to several different standardized output images, in one embodiment of the apparatus of the present invention.

As FIG. 6B shows a "one-to-many" conversion, whereby one piece of specified raw image data is converted to several different standardized output images. The image standardization criteria would specify the attributes to be given to each of the output images. In this case, the one specified raw image is standardized into three separate output images, the first being a different file format, the second being a different size, and the third being a different resolution. Also demonstrated is the addition of identifying matter to each of the standardized images, which will identify the source image from which the standardized photos have been generated.

Figure 6C:
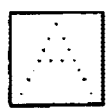
FIG. 6C is a block diagram illustrating a "many-to-many" conversion relationship between the specified raw image data and the standardized output data, in one embodiment of the apparatus of the present invention.
Figure 6C:
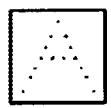
Figure 6C:
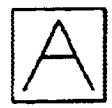
Figure 6C:
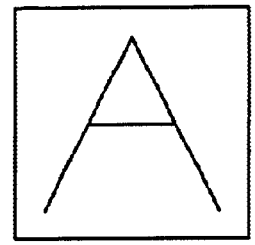
Figure 6C:
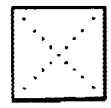
Figure 6C:
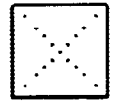
Figure 6C:
Figure 6C:
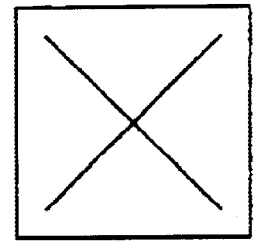

FIG. 6C demonstrates a "many-to-many" conversion relationship between the specified raw image data and the standardized output data. A series of raw image data are selected for standardization, and each of the images selected is in turn standardized into a series of standardized output images (16). Also demonstrated in FIG. 6C is the addition of identifying matter.

Figure 6D:
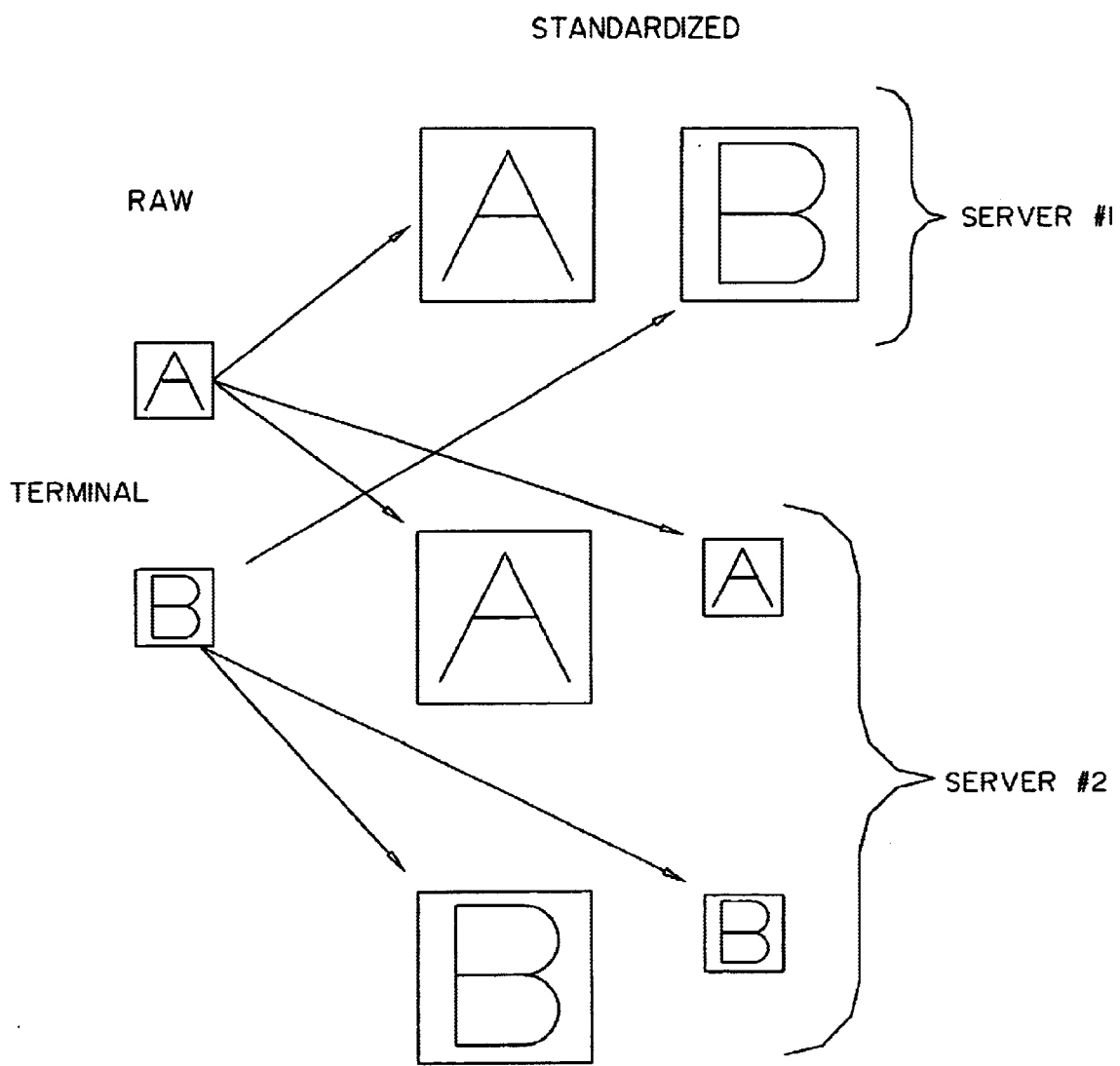
FIG. 6D is a block diagram illustrating a "many-to-many" conversion situation whereby one of the image standardization criteria provided for the various images generated from each input image is to send the output image to different servers, in one embodiment of the apparatus of the present invention.

FIG. 6D, finally, demonstrates a "many-to-many" conversion situation where one of the image standardization criteria provided for the various images generated from each input image is to send the output images to different servers.

As such it is demonstrated how the apparatus, method or computer program of the present invention can take raw image data stored in the terminal computer and apply standard formatting attributes to that image data before transmission of the standardized image data to one or more central server computers for storage and use in a centralized database application. By the addition of identifying matter to the standardized image data as it is transmitted, which identifying matter can be added in numerous ways, the standardized image data can be properly filed within the databases maintained in the said central server computer(s). The identifying matter might also be used to cross-reference image data stored in an image database to a corresponding data record in a non-image database.

The method and apparatus described above could obviously also be embodied in a computer program stored on a computer-readable medium for execution on a terminal computer, accomplishing the process laid out in detail above.

It will be obvious that in certain cases the particular method of programming computers to carry out the method of the present invention will require certain programming conventions to be followed in order to integrate properly with other software or operating system conventions. For example, where the program of the present invention was a browser plug-in or applet, it may be necessary to add certain security programming, certificates or features to allow the program to interface with the local file system on the terminal computer. It will be understood that all such requirements or modifications insofar as they merely assist in the accomplishment of the overall goals of the present concept and invention are contemplated within the scope of the present invention.

Thus it can be seen that the invention accomplishes all of its stated objectives. The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

LISTING OF DIAGRAM REFERENCE NUMERALS 1. server;
2. terminal;
3. terminal CPU;
4. terminal memory;
5. terminal input device;
6. server port;
7. terminal port;
8. image database;
9. user profile database;
10. server CPU instructions;
11. terminal image data;
12. terminal CPU instructions;
13. image standardization criteria;
14. standardized image data;
15. identifying matter;
16. terminal display;

We claim:

1. An apparatus for the storage of standardized image data, said apparatus comprising:
   a) a central server computer in which standardized image data is stored;
   b) at least one terminal computer, said terminal computer being adapted for communicating with said central server;
   c) said terminal computer containing a terminal program adapted to be executed by said terminal computer, for reformatting specified raw image data stored in the terminal computer to meet a predetermined set of image standardization criteria, said reformatted specified raw image data being standardized image data, said standardized image data then being transmitted to the central server computer for storage.

2. The apparatus of claim 1 wherein said predetermined set of image standardization criteria includes one or more of the following:
   a) a standard file format;
   b) standard image dimensions; or
   c) a standard image resolution.

3. The apparatus of claim 1 wherein said terminal program is adapted to authenticate the user of said terminal against user profiles stored in the central server computer in advance of the reformatting of specified raw image data.

4. The apparatus of claim 3 wherein said terminal program is further adapted to download a user-specific predetermined set of image standardization criteria from the central server computer upon authentication of the user.

5. The apparatus of claim 1 wherein said terminal program is resident in the terminal computer.

6. The apparatus of claim 1 wherein said terminal program is loaded into the terminal computer from the central server computer.

7. The apparatus of claim 1 wherein the set of image standardization criteria is loaded into the terminal computer from the central server computer.

8. The apparatus of claim 2 wherein said predetermined set of image standardization criteria includes a standard file format, and said terminal program converts said specified raw image data to said standard file format.

9. The apparatus of claim 2 wherein said predetermined set of image standardization criteria includes standard image dimensions, and said terminal program scales said specified raw image data to said standard image dimensions.

10. The apparatus of claim 2 wherein said predetermined set of image standardization criteria includes a standard image resolution, and said terminal program resamples said specified raw image data to said standard image resolution.

11. The apparatus of claim 1 wherein said predetermined set of image standardization criteria includes criteria for the generation of more than one standardized image from the specified raw image data.

12. The apparatus of claim 1 wherein said terminal program is adapted to verify that the transmission of the standardized image data to the central server computer has taken place without errors.

13. The apparatus of claim 12 wherein said terminal program verifies the error-free reception of the standardized image data by the central server computer by receiving an error-free message from the central server computer.

14. The apparatus of claim 1 wherein said terminal program will re-transmit standardized image data to the central server computer if the standardized image data was not received without errors.

15. The apparatus of claim 12 wherein said terminal program will re-transmit standardized image data to the central server computer, if notified by the central server computer that the standardized image data was not received without errors in the previous transmission.

16. The apparatus of claim 1 wherein said central server computer and said terminal computer are connected by a network.

17. The apparatus of claim 16 wherein the network is the Internet.

18. The apparatus of claim 17 wherein said terminal program is a browser plug-in.

19. The apparatus of claim 1 wherein said terminal program further assigns identifying matter to the standardized image data generated, said identifying matter being transmitted to said central server computer along with the associated standardized image data.

20. The apparatus of claim 17 wherein said terminal program is an applet.

21. The apparatus of claim 19 wherein said central server computer files standardized image data received from the terminal computer in storage in the central server computer in accordance with the identifying matter.

22. The apparatus of claim 19 wherein said terminal program assigns said identifying matter by obtaining input of the identifying matter from the user.

23. The apparatus of claim 19 wherein said terminal program generates said identifying matter.

24. The apparatus of claim 22 wherein said terminal program generates said identifying matter using parameters provided by the central server computer.

25. The apparatus of claim 1 wherein the specified raw image data consists of a single raw image to be reformatted, and the standardized image data consists of one or more standardized images of the one raw image.

26. The apparatus of claim 1 wherein the specified raw image data consists of more than one raw image to be reformatted, and the standardized image data comprises one or more standardized images of each of the specified raw images.

27. The apparatus of claim 1 wherein the terminal computer further comprises a display unit, and the terminal program displays the standardized image data for approval by the user of the terminal computer before transmission thereof to the central server computer.

28. The apparatus of claim 1 wherein the number of terminal computers is one.

29. The apparatus of claim 1 wherein the number of terminal computers is more than one.

30. A method of standardizing image data for storage in a central location, using a central server computer in which standardized image data is to be stored and at least one terminal computer in which raw image data is stored, said terminal computer being adapted for communication with said central server computer, said terminal computer containing a terminal program adapted to be executed by said terminal computer, said method comprising the steps of:
   a) specifying the raw image data within the terminal computer to be standardized;
   b) reformatting said specified raw image data to meet a predetermined set of image standardization criteria, the resulting reformatted specified raw image data being standardized image data; and
   c) transmitting said standardized image data to the central server computer for storage therein.

31. The method of claim 29 wherein the terminal computer includes user input means and wherein the specified raw image data is specified by user input at the terminal computer.

32. The method of claim 29 further comprising authenticating the user of said terminal computer against user profiles stored in the central server computer in advance of the specification of raw image data to be reformatted.

33. The method of claim 31 further comprising downloading a user-specific predetermined set of image standardization criteria from the central server computer upon authentication of the user.

34. The method of claim 29 wherein the predetermined set of image standardization criteria includes one or more of the following:
   a) a standard file format;
   b) standard image dimensions; or
   c) a standard image resolution.

35. The method of claim 33 wherein said predetermined set of image standardization criteria includes a standard file format, and wherein standardizing said specified raw image data comprises converting said specified image data to said standard file format.

36. The method of claim 33 wherein said predetermined set of image standardization criteria includes standard image dimensions, and wherein standardizing said specified raw image data comprises scaling said specified image data to said standard image dimensions.

37. The method of claim 33 wherein said predetermined set of image standardization criteria includes a standard image resolution, and wherein standardizing said specified raw image data comprises resampling said specified image data to said standard image resolution.

38. The method of claim 29 wherein said predetermined set of image standardization criteria includes criteria for the generation of more than one standardized image from the specified raw image data.

39. The method of claim 29 further comprising the assignment of identifying matter to the standardized image data generated and transmitting said identifying matter to said central server computer along with the associated standardized image data.

40. The method of claim 38 further comprising filing the standardized image data in the central server computer in accordance with the identifying matter.

41. The method of claim 38 wherein said identifying matter are assigned by user input at the terminal computer.

42. The method of claim 38 wherein said identifying matter are generated by the terminal program.

43. The method of claim 42 wherein said identifying matter is generated using parameters provided by the central server computer.

44. The method of claim 29 wherein the raw image data specified comprises a single raw image to be reformatted, and the standardized image data comprises one or more standardized images of the single specified raw image.

45. The method of claim 29 wherein the specified raw image data comprises more than one raw image to be reformatted, and the standardized image data consists of one or more standardized images of each specified raw image.

46. The method of claim 29 wherein said terminal program is resident in the terminal computer.

47. The method of claim 29 wherein said terminal program is loaded into the terminal computer from the central server computer.

48. The method of claim 29 wherein said central server computer and said terminal computer are connected by a network.

49. The method of claim 47 wherein said network is the Internet.

50. A computer program stored on a computer readable medium operative to control a terminal computer for the standardization of specified raw image data residing in said terminal computer for transmission to a central server computer with which said terminal computer is adapted to communicate, which computer program, when executed by said terminal computer, will perform the steps of:

a) selecting the raw image data to be standardized;

b) reformatting the selected raw image data to meet a predetermined set of image standardization criteria, said reformatted raw image data being standardized image data; and c) transmitting said standardized image data to the central server for storage therein.

51. The computer program of claim 49 wherein the image standardization criteria comprise one or more of the following:

a) a standard file format;

b) standard image dimensions; or c) standard image resolution.

52. The computer program of claim 49 further comprising a step to error-check the receipt of the transmitted standardized image data by the central server computer after transmission thereof, and to resend the standardized image data if the central server computer did not receive the standardized image data without errors.

53. The computer program of claim 49 wherein the image data selected is a single raw image.

54. The computer program of claim 49 wherein the raw image data selected comprises more than one raw image.

55. The computer program of claim 50 wherein said predetermined set of image standardization criteria includes a standard file format, and step (b) thereof comprises converting said selected raw image data to said standard file format.

56. The computer program of claim 50 wherein said predetermined set of image standardization criteria includes standard image dimensions, and step (b) thereof comprises scaling said selected raw image data to said standard image dimensions.

57. The computer program of claim 50 wherein said predetermined set of image standardization criteria includes a standard image resolution, and step (b) thereof comprises resampling said selected raw image data to said standard image resolution.

58. The computer program of claim 49 wherein said predetermined set of image standardization criteria includes criteria for the generation of more than one standardized image from the specified raw image data.

59. The computer program of claim 51 further comprising the step of assigning identifying matter to the standardized image data for transmission to the central server computer along with the standardized image data.

60. The computer program of claim 58 wherein said identifying matter is assigned by user input at the terminal computer.

61. The computer program of claim 58 wherein said identifying matter is generated by the computer program.

62. The computer program of claim 58 wherein said identifying matter is generated using parameters received from the central server computer.

63. The computer program of claim 49 wherein said compute r program is a browser plug in.

64. The computer program of claim 49 wherein said computer program is an applet.

65. The computer program of claim 49 further comprising the step of authenticating the user of said terminal computer against a set of user profiles stored on the central server computer, in advance of selecting raw image data to be standardized.

66. The computer program of claim 65 wherein a user-specific set of predetermined image standardization criteria is loaded into the terminal computer from the central server computer upon authentication of the user.

* * * * *